(12) United States Patent
Chen

(10) Patent No.: US 7,217,018 B1
(45) Date of Patent: May 15, 2007

(54) STRUCTURE OF AUTOMOBILE LAMP

(76) Inventor: To-Cheng Chen, 2F., 178, Sec. 5, Yanping N. Rd., Shihlin Dist., Taipei (TW)

( * ) Notice: Subject to any disclaimer, the term of this patent is extended or adjusted under 35 U.S.C. 154(b) by 0 days.

(21) Appl. No.: 11/459,319

(22) Filed: Jul. 21, 2006

(51) Int. Cl.
*F21V 9/10* (2006.01)

(52) U.S. Cl. ............... 362/510; 362/524; 362/284; 362/324

(58) Field of Classification Search ........... 362/510, 362/512, 513, 524, 255, 323, 280, 284, 324, 362/293
See application file for complete search history.

(56) References Cited

U.S. PATENT DOCUMENTS 4,291,365 A * 9/1981 Tandon et al. ............. 362/281
4,951,178 A * 8/1990 Shirai et al. ............... 362/512
5,488,546 A * 1/1996 Sato et al. ................. 362/466
6,866,403 B1 * 3/2005 Schaak ...................... 362/284

* cited by examiner

*Primary Examiner*—Laura K. Tso
(74) *Attorney, Agent, or Firm*—Pai Patent & Trademark Law Firm; Chao-Chang David Pai

(57) ABSTRACT

An improved structure of the automobile lamp includes a base, a fixing pipe having two longitudinal grooves, and a lamp seat fixedly connected on the base inside the fixing pipe for combining with an automobile lamp body. An outer pipe is provided with a driving gear at its bottom end for engaging with a DC reduction motor and two staggered threads at its inner call. A colored inner pipe is provided between the fixing pipe and the lamp seat. Two guiding rods extend from the inner pipe and penetrate through the two longitudinal grooves of the fixing pipe to be received in the staggered threads of the outer pipe. When the output shaft of the DC reduction motor rotates, it drives the outer pipe to rotate and move the inner pipe forwardly to cover the automobile lamp body to change its light into another color.

5 Claims, 6 Drawing Sheets

STRUCTURE OF AUTOMOBILE LAMP

BACKGROUND OF THE INVENTION

1. Field of the Invention

The present invention relates to an improved structure of an automobile lamp. In particular, the present invention is characterized in that one automobile headlight has dual functions without changing the structure and external mechanism thereof.

2. Description of the Prior Art

FIG. 1 shows a conventional fog lamp. The fog lamp 5 is constituted of a lamp cover 51, a bulb 52, a reflective mirror 53, an outer casing 54 and an iron frame 55. By providing in the car a projecting seat 56 and a support 57 beneath the outer casing 54, when the bulb 52 emits light and the light is reflected by the reflective mirror 53, the light can pierce the glass or the transparent lamp cover 51 to the outside. With the above arrangement, a fog lamp for emitting a blazing light can be formed.

Such kind of fog lamp has been used for a long time. It can provide a much clearer light for the driver when driving in a dense fog or heavy rain, thereby to ensure the safety in driving. However, such a structure has generated a lot of disadvantages after a long-term use.

1. If the existing headlight is intended to have the functions of piercing the dense fog and increasing the illuminated distance and its illumination, it has to be additionally provided with a fog lamp so as to achieve the fog-proof effect.
2. When a fog lamp is provided in the car, since the power of the bulb in the fog lamp is smaller than that of the bulb in the headlight, the illuminated distance and illumination of the light emitted by the fog lamp are also smaller than those emitted by the headlight which is changeable to a fog lamp.
3. Providing an additional fog lamp makes the structure complicated and the operation troublesome.
4. When two cars meets in the night, tunnel or culvert, the harsh light emitted by the headlight of the oncoming car often hurts the eyes of the driver and the driver even feels dizzy, so that a traffic accident may unfortunately happen at that time. If a device for changing the color of the light emitted by the headlight is turned on with the cooperation of the high/low beam of the headlight to variably control the intensity of the light source, the intensity of the light emitted by the oncoming car can be reduced to a soft orange light. Therefore, when two cars meet, the traffic accident can be prevented from happening.

Therefore, the above conventional device really has some drawbacks and needs to be improved.

In view of the drawbacks of the conventional fog lamp, the inventor of the present invention thus provides an improved structure of an automobile lamp based on his expert experience and research.

SUMMARY OF THE INVENTION

The object of the present invention is to provide an improved structure of an automobile lamp in which a colored mask pervious to light can be extended or retracted with the action of a mechanical means, so that the white-wavelength light of the headlight can be instantaneously changed into an orange-wavelength light to pierce the dense fog. In this way, the distance of the road illuminated by the light can be extended and thus the fog-proof effect is also achieved.

Another object of the present invention is to provide an improved structure of the automobile lamp in which one headlight can have dual functions without changing the structure and external means thereof.

In order to achieve the above objects, the improved structure of the automobile lamp of the present invention comprises a base, a DC reduction motor, an outer pipe and an inner pipe. The base is provided with a fixing pipe to extend thereon. The fixing pipe is provided with longitudinal grooves thereon. The base is fixedly connected to a lamp seat for combining with an automobile lamp body. The lamp seat is provided in the fixing pipe. The bottom of the outer pipe is provided with a driving gear, and the inner wall of the outer pipe is provided with two staggered threads. The outer pipe is disposed to cover the outside of the fixing pipe with the driving gear at the bottom of the outer pipe near the base. The output shaft of the DC reduction motor is fixedly connected to a transmission gear. The DC reduction motor is fixed to one side of the base so as to engage the transmission gear on the output shaft of the DC reduction motor with the driving gear at the bottom of the outer pipe. The inner pipe has a certain color. A guiding rod extends from each of two opposite locations on the outer wall of the inner pipe. The inner pipe is disposed between the lamp seat and the fixing pipe with the two guiding rods penetrating through the two longitudinal grooves of the fixing pipe, and thus the inner pipe is received in the two staggered threads on the inner wall of the outer pipe. When the output shaft of the DC reduction motor rotates, it synchronously drives the outer pipe to rotate. As a result, due to the rotation of the outer pipe and the restriction of the guiding grooves of the fixing pipe, the inner pipe moves forwardly to a certain distance, thereby covering the automobile lamp body. In this way, after the white-wavelength light of the lamp body penetrates the colored inner pipe, it changes into a light having another wavelength, thereby achieving the fog-proof effect.

These features and advantages of the present invention will be fully understood and appreciated from the following detailed description of the accompanying drawings.

DETAILED DESCRIPTION OF THE PREFERRED EMBODIMENT

Figure 1:
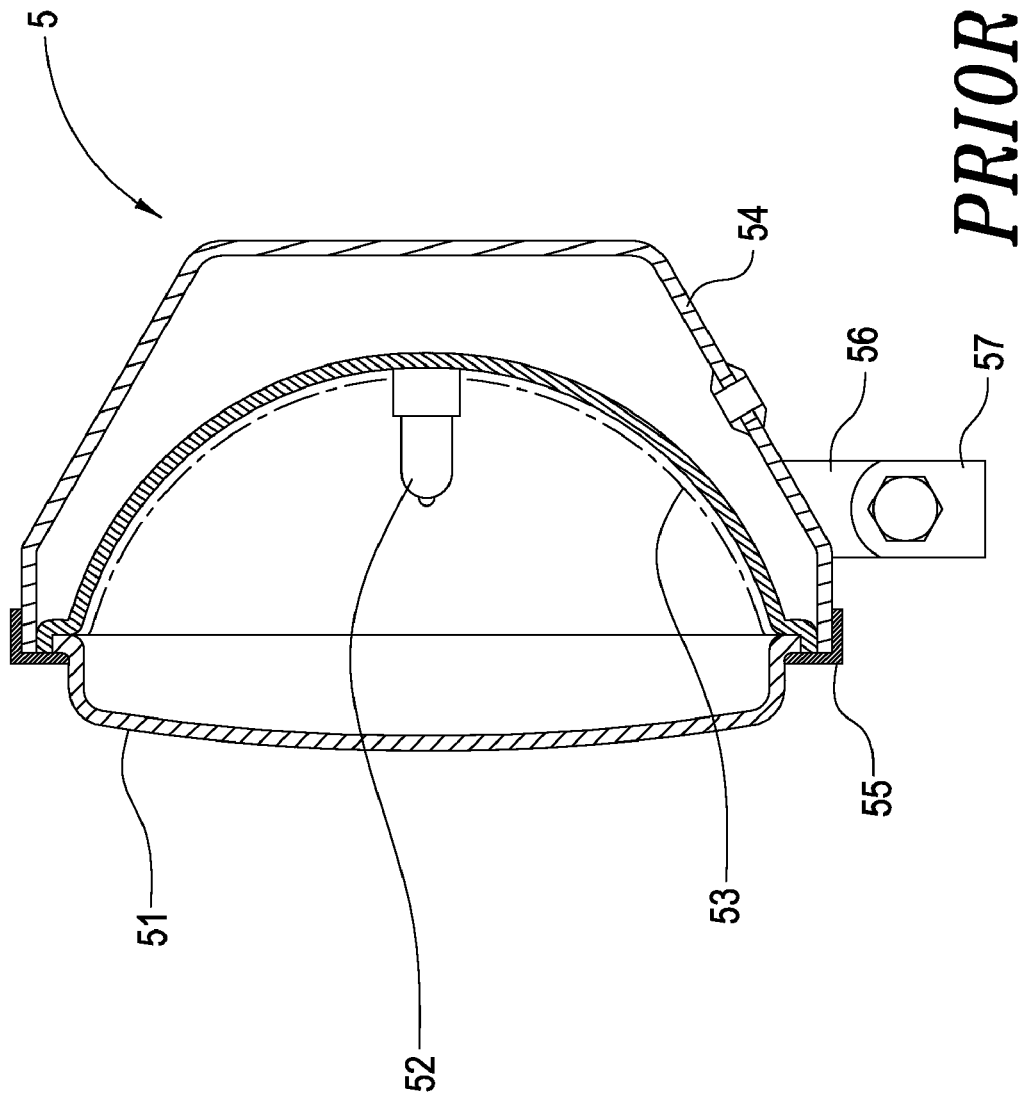
FIG. 1 is a schematic view showing the structure of prior art.
Figure 2:
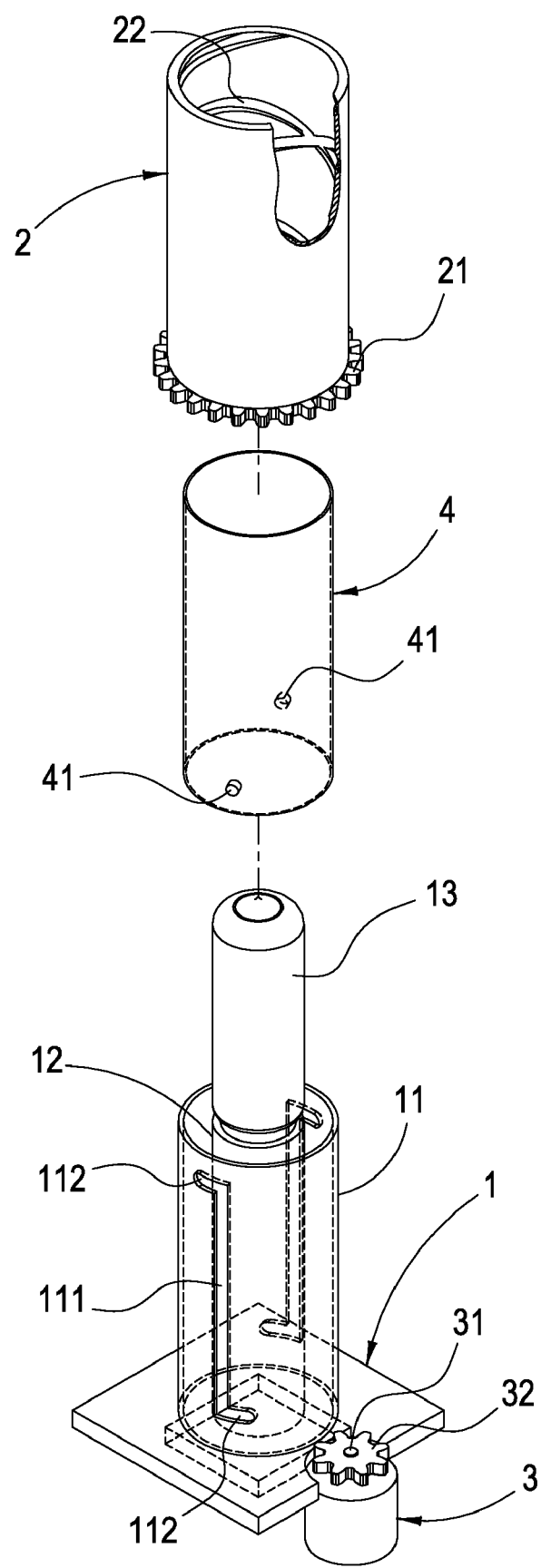
FIG. 2 is an exploded view showing the improved structure of the automobile lamp of the present invention.
Figure 3:
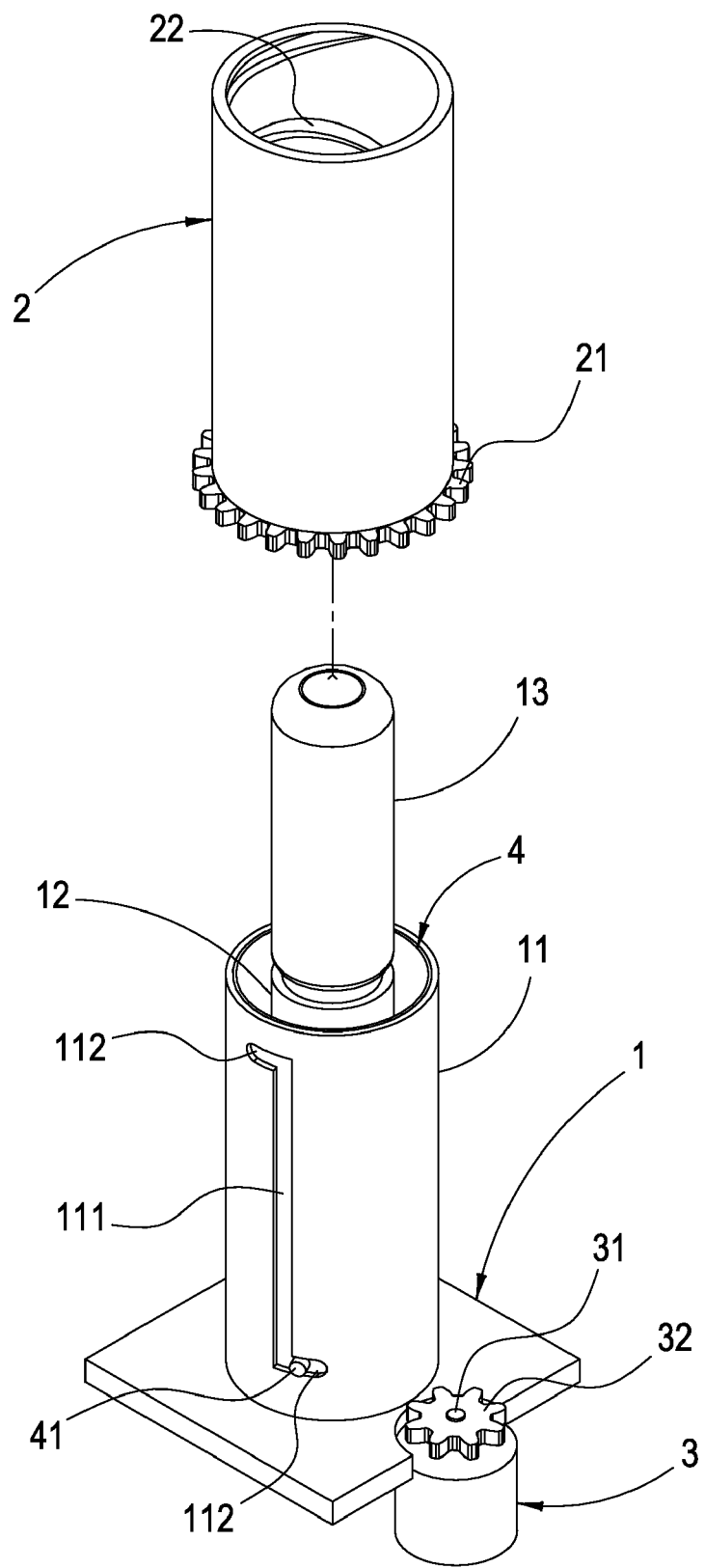
FIG. 3 is an assembled view showing the improved structure of the automobile lamp of the present invention.
Figure 4:
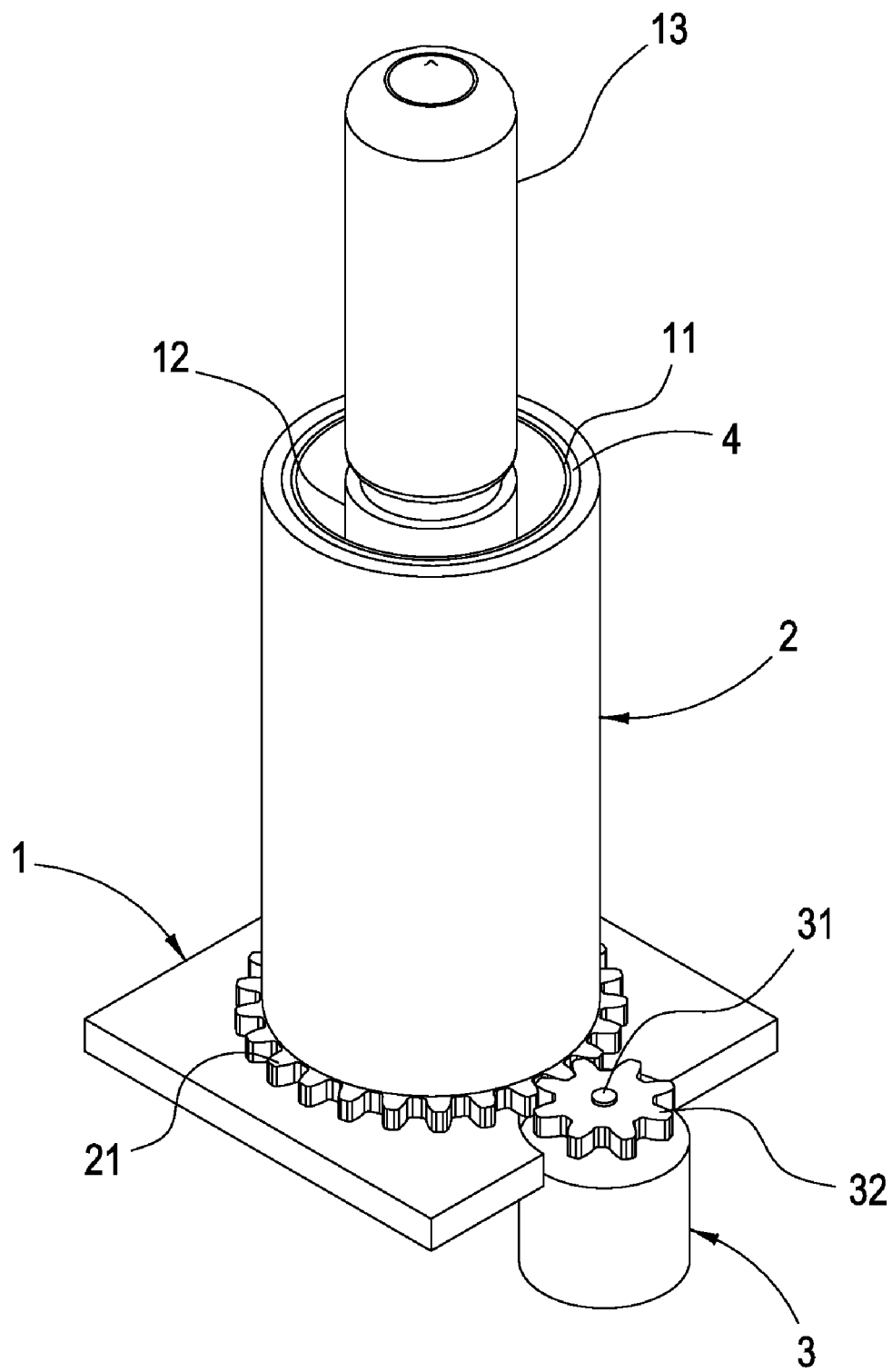
FIG. 4 is a perspective view showing the improved structure of the automobile lamp of the present invention.

With reference to FIGS. 2 to 4, the improved structure of the automobile lamp of the present invention mainly comprises a base 1, an outer pipe 2, a DC reduction motor 3 and an inner pipe 4.

The base 1 is provided with a fixing pipe 11 to extend thereon. The fixing pipe 11 is provided with longitudinal grooves 111 thereon. Both ends of each longitudinal groove are provided with a locking groove 112, respectively. The base 1 is provided with a lamp seat 12 for combining with an automobile lamp body 13. The lamp seat 12 is provided in the fixing pipe 11.

The bottom end of the outer pipe 2 is provided with a driving gear 21, and the inner wall of the outer pipe 2 is provided with two staggered threads 22. The outer pipe 2 is disposed to cover the outside of the fixing pipe 11 with the driving gear 21 at the bottom end of the outer pipe 2 near the base 1. The outer pipe 2 can be a metallic pipe.

The output shaft 31 of the DC reduction motor 3 is fixedly connected with a transmission gear 32. The DC reduction motor 3 is fixed to one side of the base 1, so that the transmission gear 32 on the output shaft 31 of the DC reduction motor 3 engages with the driving gear 21 at the bottom of the outer pipe 2. The DC reduction motor 3 is energized by the power source in the car, so that the DC reduction motor 3 can be normally operated.

The inner pipe 4 has a certain color and is preferably orange. A guiding rod 41 extends from each of two opposite locations on the outer wall of the inner pipe 4. The inner pipe 4 is disposed between the lamp seat 12 and the fixing pipe 11. The guiding rods 41 on the inner pipe 4 penetrate through the two longitudinal grooves 111 of the fixing pipe 11, respectively, and are received in the two threads 22 on the inner wall of the outer pipe 2.

Figure 5:
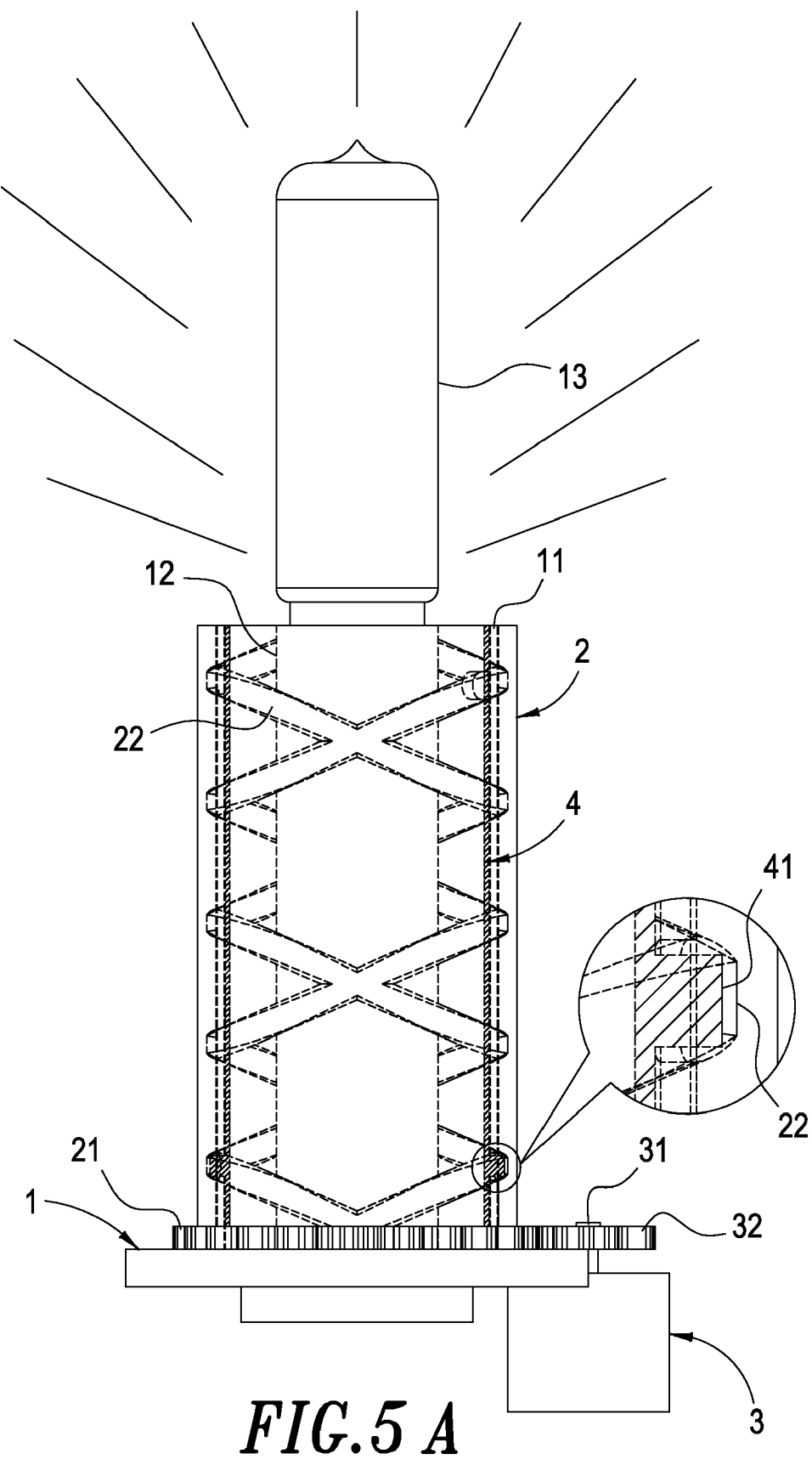
FIGS. 5A and 5B are schematic views showing the operation of the improved structure of the automobile lamp of the present invention.
Figure 5:
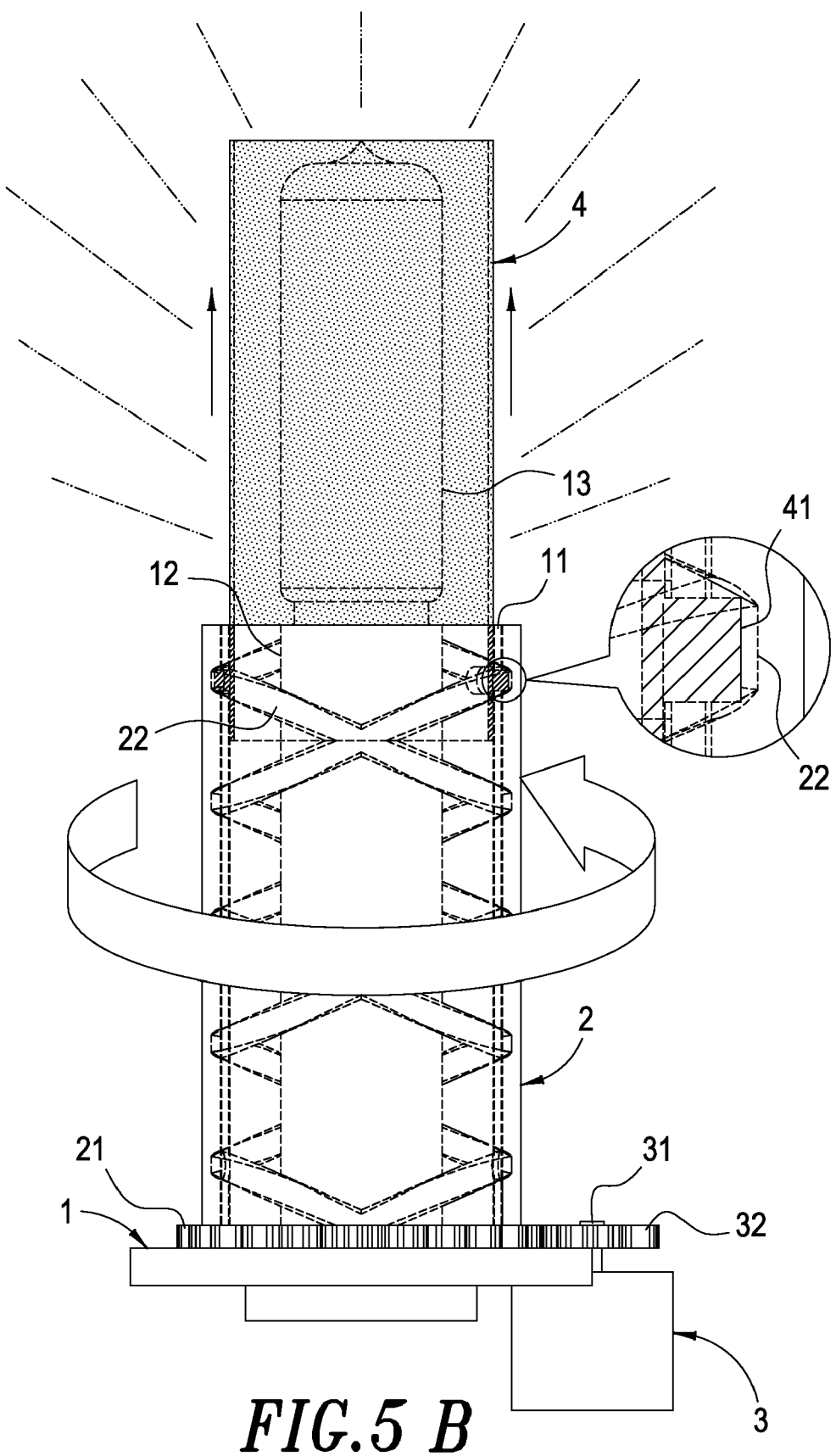

FIGS. 5A and 5B are schematic views showing the operation of the present invention. When the output shaft 31 of the DC reduction motor 3 rotates, it drives the driving gear 21 at the bottom end of the outer pipe 2 to rotate via the transmission gear 32, so that the outer pipe 2 rotates therewith. Therefore, due to the rotation of the outer pipe 2, the inner pipe 4 moves upwardly along the threads 22 on the inner wall of the outer pipe 2. At this time, the guiding rods 41 of the inner pipe 4 penetrate though the longitudinal grooves 111 of the fixing pipe 11, so that the inner pipe 4 is restricted by the grooves 111 to only move in the forward and rearward direction (i.e. in the upward and downward direction as in FIGS. 5A and 5B) but cannot rotate. When the inner pipe 4 moves forwardly into the locking groove 112 on the upper end of the longitudinal groove 111, it covers the automobile lamp body 13. As a result, the white-wavelength light of the lamp body 13 is changed into a light with another wavelength through the colored inner pipe 4. Therefore, the distance of the road illuminated by the light can be extended and thus the fog-proof effect is also achieved. When not in use, the outer pipe 2 rotates in an opposite direction with the operation of the DC reduction motor 3, thereby moving the inner pipe 4 backwardly. As a result, the automobile lamp body 13 returns to emit a white-wavelength light without its color being changed.

In comparison with the conventional art, the improved structure of the automobile lamp of the present invention has the following advantages:

(1) The headlight of the present invention can be changed into a fog lamp. The headlight has a function of illuminating the road, and can be also changed into an orange light to illuminate the road at any time. The orange-wavelength light can penetrate a dense fog and extend the illuminated distance of road. Thus, safety in driving on the road can be efficiently improved, so that the life and property of the driver can be secured.

(2) The present invention also functions as a fog lamp. Therefore, the cost and the change in the appearance and structure caused by additionally providing the fog lamp in conventional cars or other vehicles can be omitted.

(3) The headlight of the present invention can be changed into a fog lamp, so that the intensity of the light emitted by the headlight can be suitably changed with the control of the high/low beam. Thus, when two cars meet in the night, tunnel or culvert, the bright headlight may hurt the eyes of the driver and even cause traffic accidents. Such conditions can be reduced by the present invention.

Many changes and modifications in the abovementioned embodiment of the present invention can, of course, be carried out without departing from the scope thereof. Accordingly, to promote the progress in science and useful arts, the present invention is disclosed and is intended to be limited only by the scope of the appended claims.

What is claimed is:

1. An improved structure of the automobile lamp, comprising:

a base provided with a fixing pipe to extend thereon, the fixing pipe provided with longitudinal grooves thereon, a lamp seat fixedly connected on the base for combining with an automobile lamp body, the lamp seat provided in the fixing pipe;

an outer pipe provided at its bottom end with a driving gear, the inner wall of the outer pipe provided with threads, the outer pipe disposed to cover the outside of the fixing pipe with the driving gear at the bottom end of the outer pipe near the base;

a DC reduction motor fixedly connected on an output shaft with a transmission gear, the DC reduction motor fixed to one side of the base so as to engage the transmission gear on the output shaft of the DC reduction motor with the driving gear at the bottom end of the outer pipe; and an inner pipe having a certain color, a guiding rod extending from each of two opposite locations on the outer wall of the inner pipe, the inner pipe disposed between the lamp seat and the fixing pipe, the guiding rods penetrating through the longitudinal grooves of the fixing pipe and received in the threads of the inner wall of the outer pipe.

2. The improved structure of the automobile lamp according to claim 1, wherein the outer pipe is a metallic pipe.

3. The improved structure of the automobile lamp according to claim 1, wherein the threads of the inner wall of the outer pipe are two staggered threads.

4. The improved structure of the automobile lamp according to claim 1, wherein the DC reduction motor is energized by a power supply on the car.

5. The improved structure of the automobile lamp according to claim 1, wherein the color of the inner pipe is orange.

* * * * *